United States Patent [19]

Sugiura et al.

[11] Patent Number: 5,160,116
[45] Date of Patent: Nov. 3, 1992

[54] ELECTROMAGNETIC VALVE

[75] Inventors: Kiyohiko Sugiura, Hekinan; Nobuaki Miki, Kariya; Takeshi Nasu; Masayuki Sugiura, both of Anjo; Masao Saito, Nishio, all of Japan

[73] Assignee: Aisin AW Co., Ltd., Japan

[21] Appl. No.: 633,617

[22] Filed: Dec. 28, 1990

[30] Foreign Application Priority Data

Dec. 28, 1989 [JP] Japan .................. 1-338193

[51] Int. Cl.$^5$ .............................. F16K 31/06
[52] U.S. Cl. .................. 251/129.14; 137/596.17; 137/625.65; 251/129.02; 251/129.15
[58] Field of Search ............ 137/596.17, 625.65; 251/129.02, 129.14, 129.15

[56] References Cited

U.S. PATENT DOCUMENTS

| | | | |
|---|---|---|---|
| 4,501,299 | 2/1985 | Klimowicz et al. | 137/625.65 |
| 4,509,716 | 4/1985 | Barber et al. | 251/129.15 X |
| 4,783,049 | 11/1988 | Northman et al. | 281/129.15 X |

Primary Examiner—Gerald A. Michalsky
Attorney, Agent, or Firm—Lorusso & Loud

[57] ABSTRACT

An electromagnetic valve having a flow passage opened and closed by the drive of an electromagnet. The electromagnetic opertor includes a casing, an electromagnetic coil, a plunger adapted to be driven by the electromagnetic coil, a sleeve for guiding the plunger, a yoke fitted around the sleeve and formed with an axially extending central portion and a notch in its outer circumference, and a push rod fixed to the plunger. The valve portion includes an outer valve body, having an input port and a discharge port, which is fixed to the casing of the electromagnet with a flange fitted over and mating with the raised central portion of the yoke. An inner valve body is mounted in the outer base and has an axial bore for receiving the push rod. A ball is interposed between the outer valve body and the inner valve body for opening or closing the passage of the valve, extending from the input port to the discharge port, by the drive of the push rod.

4 Claims, 4 Drawing Sheets

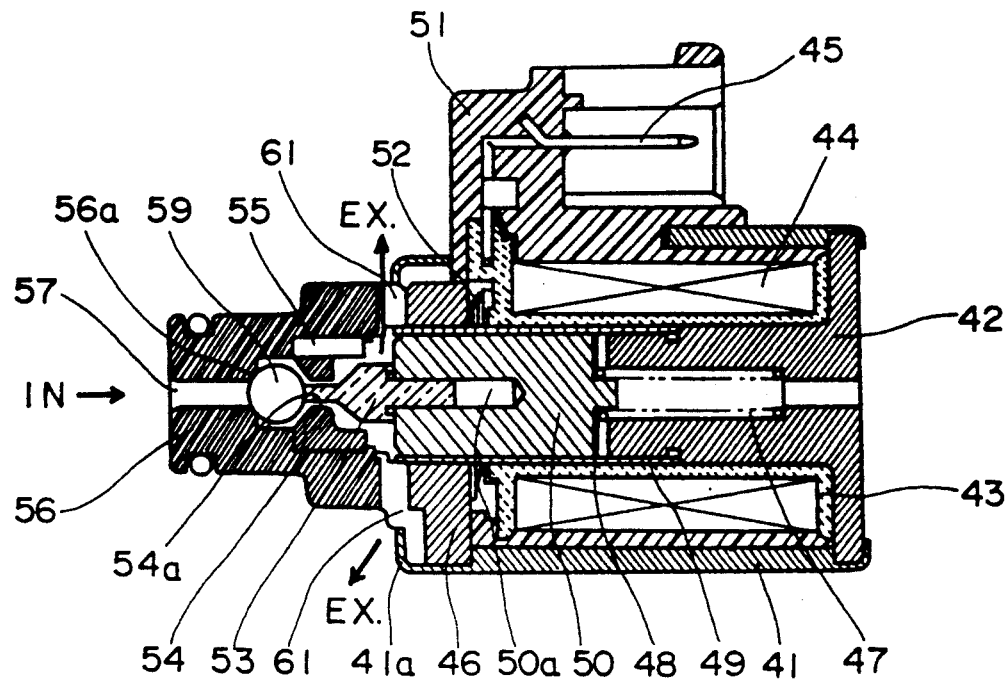
FIG. 1
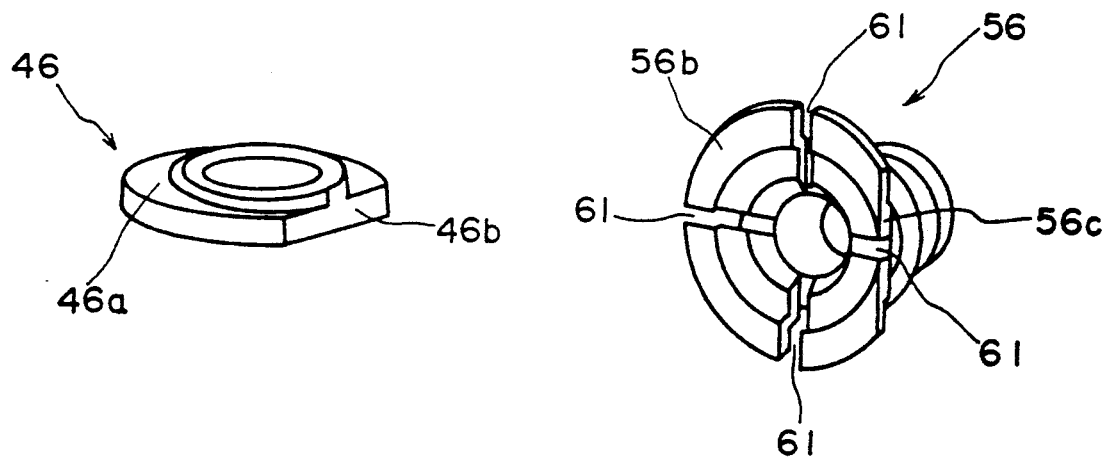
FIG. 2
FIG. 3

ELECTROMAGNETIC VALVE

BACKGROUND OF THE INVENTION

1. Field of the Invention

The present invention relates to an electromagnetic valve and, more particularly, to an electromagnetic valve which has a ball displaced by action of electromagnetic means in response to an electric signal to switch fluid flow.

2. Description of the Prior Art

An example of prior art in the above-described field will be described below with reference to FIG. 7.

The two-way electromagnetic valve of the prior art shown in FIG. 7 includes a casing 1, a core 2, an electromagnetic coil 4 wound on a bobbin 3, a terminal 5 protruding from a resin molding 9, and an electromagnetic operator having a yoke 6, a coil spring 7 and a plunger 8. The valve portion of the two-way electromagnetic valve has a valve body 10 formed with an input port 12 and a discharge port 13, and a ball 11 adapted to be seated in a valve seat provided in valve body 10 by forward movement of plunger 8.

In the two-way electromagnetic valve of the prior art described above, the yoke 6 is formed with an annular shape having a constant thickness so that its external size is large. The large size of the prior art valve presents a problem in a vehicle having limited space for mounting such valves.

SUMMARY OF THE INVENTION

It is, therefore, an object of the present invention to solve the above-specified problems and to provide an electromagnetic valve which is compact by reason of a thinner yoke, without increasing the magnetic resistance of the magnetic circuit.

In order to achieve the above-specified object, according to the present invention, there is provided an electromagnetic valve including an electromagnetic section having a casing, an electromagnetic coil, a plunger adapted to be driven by said electromagnetic coil, a sleeve for guiding the plunger, a yoke fitted around the sleeve and having an outer circumferential portion of reduced thickness and a notch in its outer circumference, and a push rod fixed to said plunger. The valve portion of the electromagnetic valve includes an outer valve body having a flange, an input port and a discharge port. The outer valve body is fixed to the casing of the electromagnetic section with its flange fitted around the shoulder of a raised central portion on one face of the yoke. The valve portion further includes an inner valve body mounted in a central cylindrical recess in the outer valve body and having a central axial opening through which the push rod extends and a ball interposed in the recess between the outer valve body and the inner valve body. The ball closes or opens a fluid passage through the valve from the input port to the discharge port by movement of the push rod.

As has been described above, according to the present invention, the yoke has a raised central portion forming a circular shoulder around which is fitted the flange of the outer valve body, so that the outer valve may be fixed to the electromagnet section by the casing. As a result, the electromagnetic valve can have a shorter casing so that it can be made compact.

The magnetic circuit for driving the plunger runs axially through the casing, then radially through the yoke, then axially through the plunger and core and then radially back to the casing through a flange of the core, thereby completing a loop MC around the coil as indicated in FIG. 1.

In this manner, the magnetic circuit is completed without any increase in the magnetic resistance due to a notch in the outer edge of the yoke.

BRIEF DESCRIPTION OF THE DRAWINGS

The foregoing and other objects and features of the present invention will become apparent from the following description, made with reference to the accompanying drawings, in which:

FIG. 1 is a cross-sectional view of a normally-closed two-way electromagnetic valve according to one embodiment of the present invention;

FIG. 2 is a perspective view of the yoke of the embodiment of an electromagnetic valve shown in FIG. 1;

FIG. 3 is a perspective view showing the outer valve body portion of the embodiment of FIG. 1;

DESCRIPTION OF THE PREFERRED EMBODIMENTS

Figure 4:
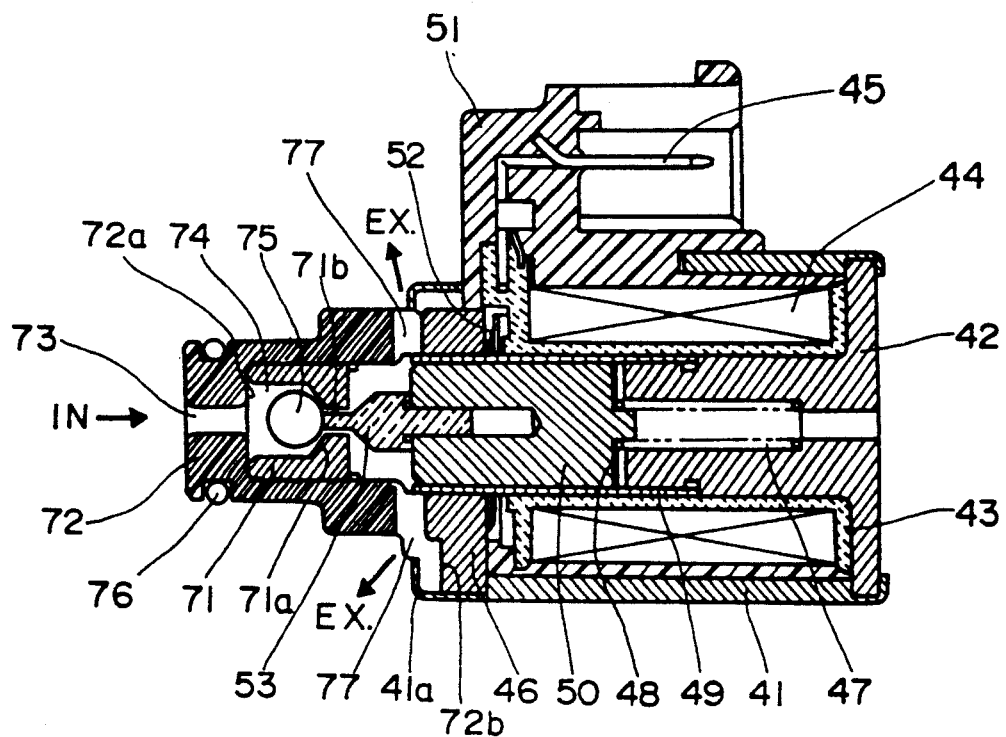
FIG. 4 is a cross-sectional view of a normally-open, two-way electromagnetic valve according to another embodiment of the present invention.
Figure 7:
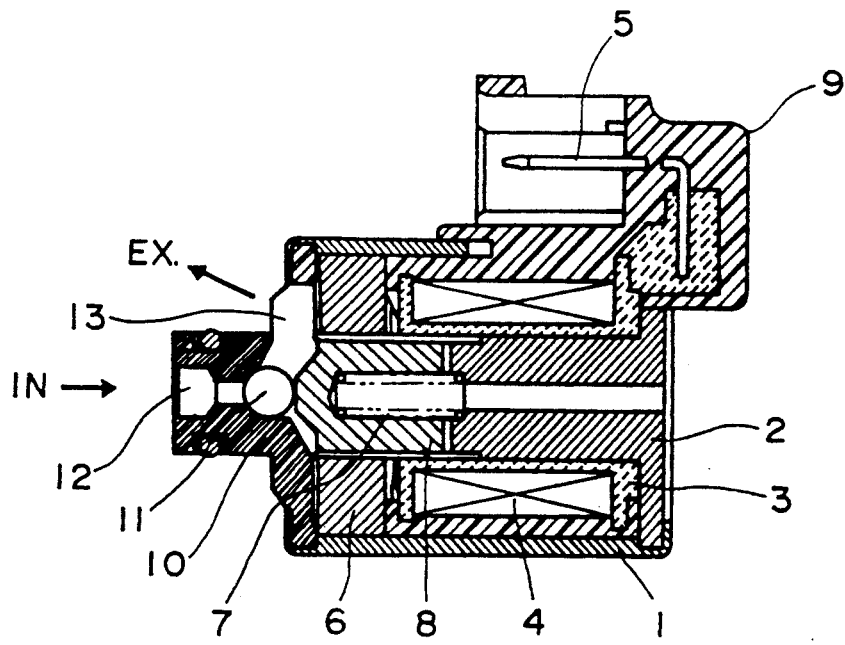
FIG. 7 is a cross-sectional view showing a two-way electromagnetic valve of the prior art.

Several preferred embodiments of the present invention will be described in detail below with reference to the accompanying drawings.

FIG. 1 shows an electromagnetic valve including a valve section and an electromagnet section. The electromagnet section includes a casing 41, a core 42, an electromagnetic coil 44 wound on a bobbin 43, a terminal 45 supported on the bobbin 43 and fixed by a resin molding 51, a yoke 46, a coil spring 47 for moving a plunger 50 forward (to the left in the drawing), spacer 48 for providing a seat for the coil spring 47, a sleeve 49 for guiding the plunger 50, a web washer 52 and a push rod 53 made of a non-magnetic material and press-fitted in a front recess 50a of the plunger 50. The yoke 46 is formed with both a circular shoulder 46a and, as seen in FIG. 2, an edge cut 46b. Here, reference characters 46b and 56c appearing in FIG. 2 and 3 designate cut-away portions on the yoke 46 and flange 56b of the valve body 56, respectively, for facilitating the assembly of the valve. The cut at 46b allows the yoke 46 to mate with preformed resin molding 51. Alternatively, cuts 46b and 56c allow for resin molding 51 to be formed after the valve body 56 has been attached to the yoke 46.

On the other hand, the valve portion includes an inner valve body 54 formed with an axial bore 54a for receiving the leading end of the push rod 53 and a passage 55 leading to a discharge port 61. The valve portion further includes an outer valve body 56 which has an axial recess 56d. The axial recess 56d which receives the inner valve body 54 and provides a stepped cylindrical surface including an annular shoulder 56e against which the leading surface of the inner valve body 54 abuts. The outer valve body 56 has an input port 57 and a valve seat 56a and, at its base, a flange 56b and a discharge port 61. A ball 59 is interposed between the valve seat 56a and the inner valve body 54 and is thus located for engagement by the leading end of the push rod 53.

The valve portion is attached to the aforementioned electromagnetic portion by fitting the flange 56b of the base portion of the outer valve body 56 around the shoulder 46a of the yoke 46 and bending over the leading edge 41a of the casing 41 against the front (left) face of the flange 56b. To facilitate this attachment the leading end of the casing 41 is made thin to enable it to be curled or folded over so as to sandwich and hold the outer edge of the yoke 46 and the outer edge of the base portion of the outer valve body 56 together.

FIG. 4 shows, as another embodiment of the invention, a normally-open two-way electromagnetic valve. This two-way electromagnetic valve has an electromagnetic section identical to that of the normally-closed type of the embodiment of FIG. 1. The valve section includes an outer valve body 72, an inner valve body 71 and a ball 75. The outer valve body 72 is formed with a radial discharge port 77, an axial input port 73 and a coaxial recess 72b forming, at its bottom, an annular shoulder 72a around the input port 73. The inner valve body 71 is fitted within recess 72b with its leading edge abutting against the shoulder 72a. This inner valve body 71 is formed with an axial recess 74 for receiving the ball 75 and a central valve seat 71a for seating the ball 75. Valve seat 71a surrounds a bore 71b for receiving the leading end of the push rod 53.

In the normally-open, two-way electromagnetic valve embodiment of FIG. 4, the yoke 46 is also formed with a raised central portion forming a circular shoulder 46a. The flange 72b of the outer valve body 72 is fitted around the shoulder 46a and is locked in place by bending over the leading end 41a of the casing 41.

Figure 5:
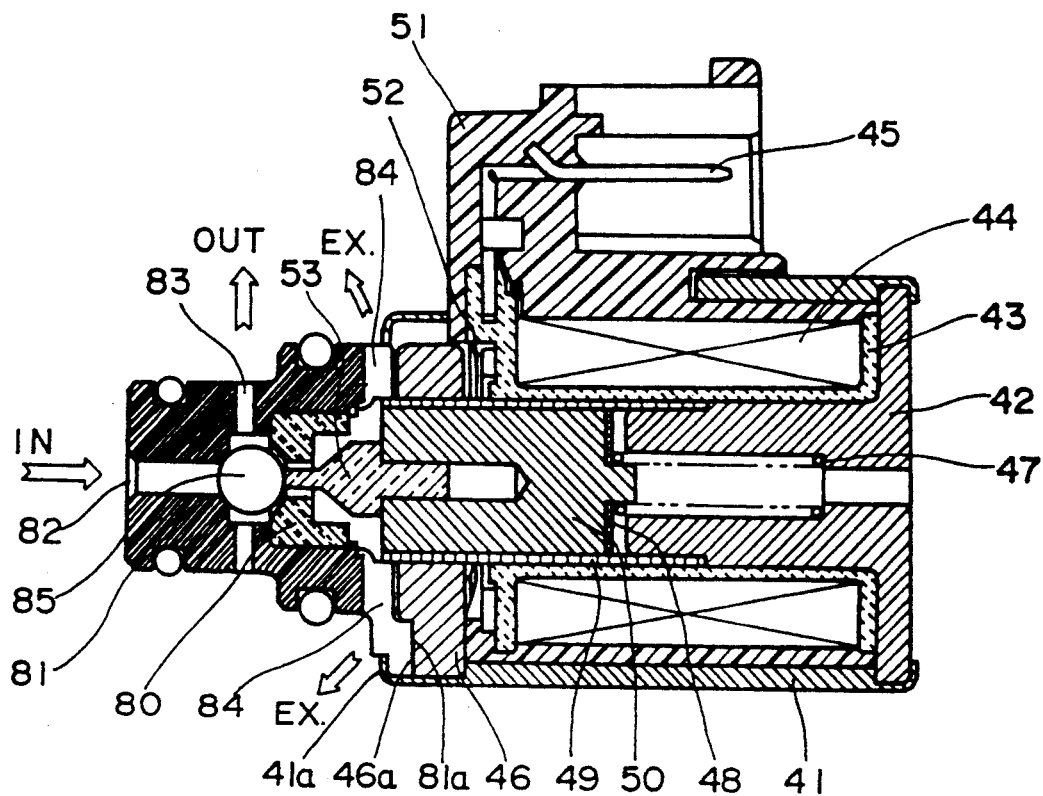
FIG. 5 is a cross-sectional view showing a normally-closed type three-way electromagnetic valve according to still another embodiment of the present invention.
Figure 6:
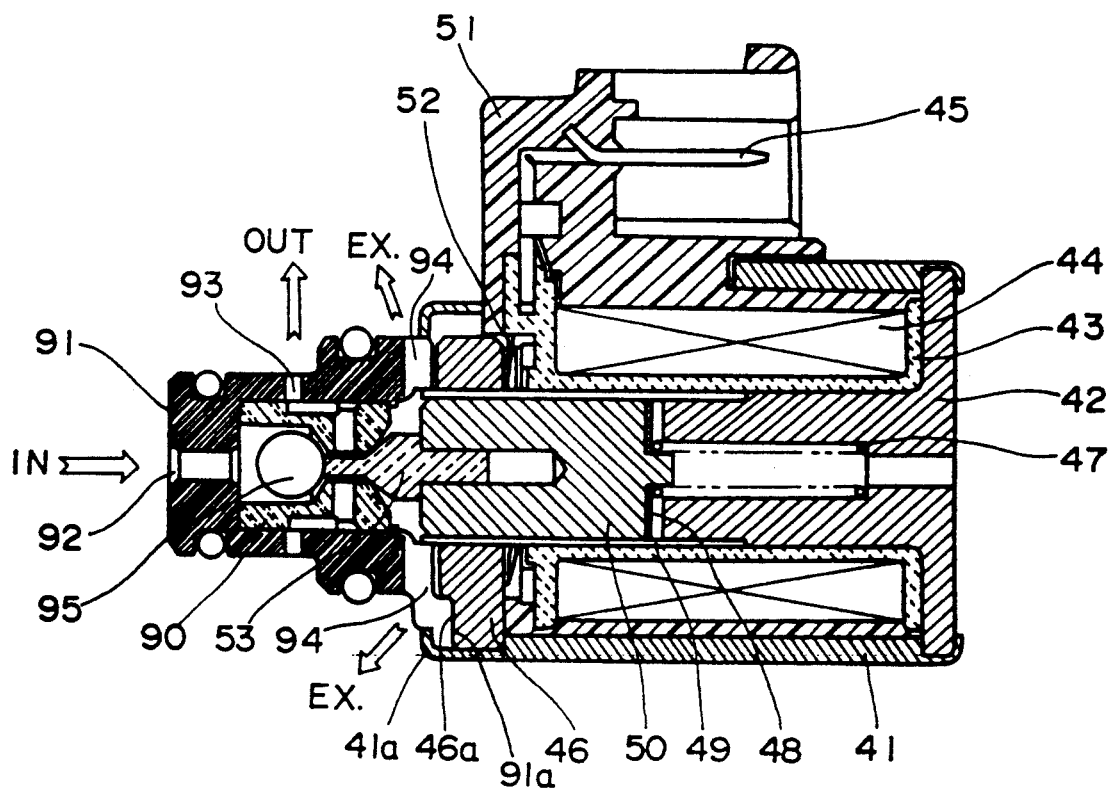
FIG. 6 is a cross-sectional view showing a normally-open type three-way type electromagnetic valve according to a further embodiment of the present invention.

FIG. 5 shows a normally-closed three-way electromagnetic valve according to still another embodiment of the present invention, and FIG. 6 shows a normally-open type three-way electromagnetic valve according to a further embodiment of the present invention.

In these three-way valves, also, the electromagnetic sections have the same basic structure as that of the aforementioned two-way valve embodiment of FIG. 1.

As shown in FIG. 5, the valve portion of the normally-closed three-way valve has an outer valve body 81, an inner valve body 80 and a ball 85. The outer valve body 81 is formed with an axial input port 82 at its leading end, a radial output port 83 at its mid-section, and a discharge port 84 at its base. The outer valve body 81 has an axial recess 81b defined by a stepped cylindrical wall which provides a shoulder 81c which receives the inner valve body 80. The space between the outer valve body 81 and the inner valve body 80 houses the ball 85 for switching fluid flow.

As shown in FIG. 6, the valve portion of the normally-open three-way embodiment has an outer valve body 91, an inner valve body 90 and a ball 95. The outer valve body 91 is formed with an axial input port 92 at its leading end, a radial output port 93 at its midsection and a discharge port 94 at its base. The outer valve body 91 has an axial recess 91b in which is fitted the inner valve body 90. The inner valve body 90 has a central recess 90a and is inserted into recess 91b, open end first. In recess 90a, between the inner valve body 90 and the outer valve body 91, is contained the ball 95 for switching fluid flow.

In the three-way valve embodiments of FIGS. 5 and 6, also, the yoke 46 is formed with a raised central portion defining a circular shoulder 45a. And, the flanges 81a and 91a of the base portions of the outer valve bodies 81 and 91 are fitted around those shoulders 46a and are held in place by the bent leading edge 41a of casings 41.

With the structures thus far described:

(1) The yoke can be made effectively thinner by thinning only the outer circumferential portion of the yoke which forms no part of the magnetic circuit, and a compact electromagnetic valve can be provided by fitting the flange of the base portion of the outer valve body around the shoulder between the radially inward thicker portion and the radially outward thinner portion of the yoke and fixing them by bending over the leading edge of the casing;

(2) Since the raised portion and shoulder of the yoke and the flange of the base portion of the outer valve body mate, the electromagnetic operator and the valve portion can be assembled with an accurate, concentric relationship;

(3) The casing of the electromagnetic means has its leading end 41a thinned to facilitate bending over. Because the length of the thinned leading end 41a should be short so as not to detract from the mechanical strength, the total thickness of the outer edge of the yoke and the flange of the base portion of the outer valve body thus superposed is so small that they can be reliably fixed together by only a short length of the leading end 41a.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. An electromagnetic valve comprising:
   a cylindrical casing defining a longitudinal axis;
   a core mounted in said casing;
   an electromagnetic coil disposed between said casing and said core;
   a plunger mounted radially inward of said electromagnetic coil for sliding movement along said axis, said plunger including a section of non-magnetic material;
   a coil spring disposed along said axis between said core and said plunger;
   an outer valve body connected to said casing and having an axial recess in one end thereof and an inlet providing fluid communication between said recess and an external fluid source and a flange at one end thereof;
   an inner valve body fitted within and closing said recess and having an axial bore to permit said plunger to be extended into said recess;
   a ball contained in said recess for opening and closing said inlet responsive to engagement and disengagement by the non-magnetic section of said plunger;
   an annular yoke fitted within said cylindrical casing between said flange and said electromagnetic coil, said yoke having inner and outer cylindrical surfaces and a shoulder on a radially extending surface facing said flange, whereby the axial dimension of said outer cylindrical surface is less than that of said inner cylindrical surface, said flange mating with said shoulder; and a sleeve provided between said plunger and said yoke for guiding movement of the plunger, said sleeve having one end connected to the core and extending axially beyond said core to an opposite end received within said yoke.

2. An electromagnetic valve in accordance with claim 1 further comprising a plastic molding around the outer circumference of said coil.

3. An electromagnetic valve in accordance with claim 2 wherein said yoke has a notch cut-out in its outer circumference and said plastic molding has a portion which mates with said notch or cut-out.

4. An electromagnetic valve in accordance with claim 1 wherein the axial dimension of said shoulder is substantially less than the axial length of said outer cylindrical surface.

* * * * *